United States Patent [19]

Dedieu et al.

[11] Patent Number: 4,998,212

[45] Date of Patent: Mar. 5, 1991

[54] METHOD OF FILING GEOGRAPHICAL MAPS AND METHOD OF READING THE FILED MAPS

[75] Inventors: Christian Dedieu, Puiseux Pontoise; Georges Attard, Jouy le Moutier; Sylvie Bouthors, Cercy Saint Christophe; Jean-Paul Cabot, Bois-Colombes; Elie Grand, Saint Georges d'Esperanche, all of France

[73] Assignee: Societe d'Applications Generales d'Electricite et de Mecanique S.A.G.E.M., France

[21] Appl. No.: 229,165

[22] Filed: Aug. 5, 1988

[30] Foreign Application Priority Data

Aug. 7, 1987 [FR] France ............... 8711267

[51] Int. Cl.$^5$ ............................................... G06F 15/66
[52] U.S. Cl. .................................... 364/518; 364/522; 340/799
[58] Field of Search ... 364/518, 521, 522, 200 MS File, 364/900 MS File; 340/706, 747, 750, 706, 798, 799

[56] References Cited

U.S. PATENT DOCUMENTS

| 4,694,352 | 9/1987 | Ina et al. | 358/257 |
| 4,715,005 | 12/1987 | Heartz | 364/521 |
| 4,742,558 | 5/1988 | Ishibashi et al. | 382/56 |
| 4,805,099 | 2/1989 | Hubu | 364/300 |
| 4,811,207 | 3/1989 | Hikita et al. | 364/200 |
| 4,821,212 | 4/1989 | Heartz | 364/521 |

FOREIGN PATENT DOCUMENTS

| 106291 | 4/1984 | European Pat. Off. |
| 109038 | 5/1984 | European Pat. Off. |
| 141508 | 5/1985 | European Pat. Off. |
| 177372 | 4/1986 | European Pat. Off. |
| 8303516 | 10/1983 | PCT Int'l Appl. |
| 2144293 | 2/1985 | United Kingdom |

Primary Examiner—Gary V. Harkcom
Assistant Examiner—Phu K. Nguyen
Attorney, Agent, or Firm—Jacobs & Jacobs

[57] ABSTRACT

A method of filing geographical maps and a method of reading the filed maps. The maps cover a zone called scale zone. For filing, the maps are arranged in order, each map is turned through a digitization angle, it is digitized by a scanner and the useless portions are cut out therefrom, the maps are located so as to determine the deformation thereof, the digitized, cut out and located maps are stored on a buffer by juxtaposing them, and the information of the buffer is stored on a digital optical disk. For reading, the map containing a point with given geographical coordinates to be placed in the center of a display screen is determined by its contour.

13 Claims, 4 Drawing Sheets

METHOD OF FILING GEOGRAPHICAL MAPS AND METHOD OF READING THE FILED MAPS

BACKGROUND OF THE INVENTION

1. Field of the Invention The present invention relates first and foremost to the filing of geographical maps.

2. Description of Related Art

Filing of geographical maps involves the prior acquisition of numerous information—it is that which is to be filed—so as to be able to re-read this information afterwards. Such filing must be particularly useful, in the navigational, air, sea or even land sectors, e.g. at the time of preparing a mission, so as to apprehend not only a vast geographical sector but also portions of this sector. Filing must also have the advantage of being able to "read" the information stored in combination with other information, such as flight plans, trajectories to follow, objectives to reach, superimposed on the first.

In short, filing must have the advantage of not requiring cumbersome space for the storage of maps.

The means at present available for filing maps are essentially photographic (production of films) and mechanical (passing of films).

Considering the unwieldiness of such means, the advantages which filing ought to provide are not.

SUMMARY OF THE INVENTION

The present invention proposes then an appropriate filing method.

Before introducing the invention, a few explanations will be given.

Let us consider a geographical sector. This sector may be cut up into geographical zones called "scale zones", each one defined by a reference meridian. Each scale zone in fact covers a plurality of geographical maps, to a given scale. Each map, of the type for example edited by the Institut Géographique National contains information written in a curvilinear trapezium with end rectilinear lateral edges (the meridians) not parallel to the reference meridian of the scale zone, often the central meridian of one of the maps. Juxtapositioning of these maps two by two, by two of their lateral edges or respective end meridians, namely superimposing these two edges or meridians, requires turning one of the maps, considered with respect to the other beforehand. If $\alpha$ and $\beta$ are respectively the angles formed between the left-hand meridian and the parallel edges of a map, on the one hand, and between these map and right-hand end meridian edges on the other, and marking with the index $i$ the information of map $i$, the angle of rotation through which the map $i+1$ must be turned with respect to map $i$, in order to superimpose the left-hand end meridian of the first and the right-hand end meridian of the second is $$\gamma_{i+1} = \alpha_{i+1} + \beta_i$$

$\alpha_{i+1}$ being a possible digitization angle of map $i+1$.

The information of a map is the colours of the pixels (picture elements) which form it. To digitize a map is to form, by scanning with a scanner, the matrix of the (pixel-colour) pairs, each colour determined by its colorimetric coordinates in the three primary colour reference system, being one of those, limited in number, of a color table formed beforehand by sampling with the participation of an operator.

The maps forming a scale zone contain useless information which should then be eliminated or cut out, such for example as the white edges of the legends. Digitization of a single box added to a map is thus tantamount to eliminating all that is inside the box.

For that, the zero color information is associated with each pixel to be eliminated manually by the operator using a slider or semi-automatically.

With these preliminary explanations given, the invention may now be presented.

The present invention concerns then a method of filing geographical maps covering at least a given scale zone, characterized by the fact that the maps are arranged in order, each map is turned through a digitization angle, each map is digitized, from each map the useless portions are cut out, each map is located so as to determine the deformation thereof, the digitized, cut out and located maps are stored on a buffer medium by juxtaposing them and the information from the buffer medium is stored on a filing medium.

Preferably, the filing medium is an optical digital disk with rapid laser reading and a very high capacity.

In the preferred embodiment of the method of the invention, each elementary map is stored and juxtaposed on the buffer medium by superimposing a point of the elementary map of given latitude L and longitude G and a point of the portion of the scale zone already stored having the same latitude L and longitude G, the portions of the scale zone already stored having priority over the portions of the elementary map during storage.

In other words, the portions of the elementary map which, after superimposition of the two points considered, are superimposed on portions of the scale zone already stored, are in fact deleted. Thus, the advantage of cutting up the elementary maps can be seen, so that white or useless map portions do not have priority over useful portions of other maps.

Preferably again, digitization of the maps is made by a scanner and the digital information of the buffer medium is cross-ruled and compressed before storage on the filing medium.

The invention also relates to a method of reading the filing medium recorded in accordance with the filing method of the invention, characterized by the fact that the map containing a point of given geographical coordinates to be placed at the center of a display screen is determined by its contour.

Preferably, with the filed scale zone cross-ruled into elementary blocks, the elementary block to be displayed in the center of the screen and containing said point is defined, the screen block is read in the center of which said elementary block is to be found and it is displayed.

BRIEF DESCRIPTION OF THE DRAWINGS

The invention will be better understood from the following description of a preferred embodiment of the filing method and of the reading method of the invention, with reference to the accompanying drawings in which.

DETAILED DESCRIPTION OF THE PREFERRED EMBODIMENT

A. RECORDING

Let us then consider a file of geographical maps to be filed, elementary maps to the same given scale, and covering, on this scale, a particular zone called scale zone, e.g. France. Filing such maps on a digital optical disk is tantamount to recording them or writing them on the disk using a method whose steps will be analysed. It should be noted that recording takes place scale zone by scale zone.

1. Arrangement of the maps in order and grid formation

Figure 1:
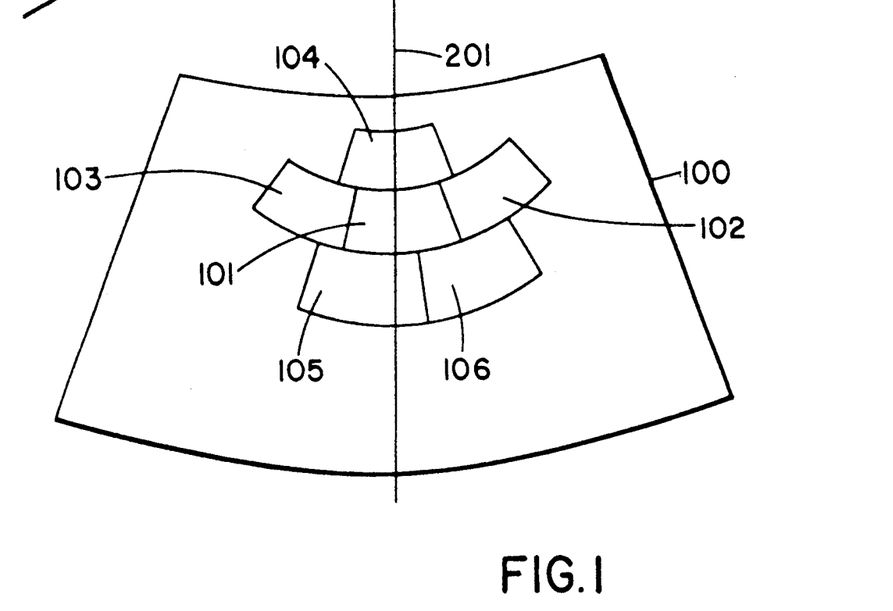
FIG. 1 illustrates the arrangement in order of the elementary maps of a scale zone.

Referring to FIG. 1, starting with the central map 101 in the geometrical meaning of the term, of the scale zone 100 and its central meridian 201 will be assumed the reference meridian of the scale zone which, at which the time of subsequent reading on a screen, will be displayed in a vertical position. In other words, the digitization angle of this central map 101 will be taken equal to zero. To this central map 101 is assigned the order number 1. Disposing the elementary maps side by side so as to form the scale zone, the number 2 is assigned to map 102 adjacent map number 1, to the east thereof; map 103 adjacent map number 1 to the west thereof receives the number 3; map 104 adjacent the central map, to the north thereof, receives the number 4; map 105 adjacent the central map, to the south thereof, receives the number 5 and so on, from east to west and north to south of the central map 1 towards the periphery of the scale zone. When several maps 105, 106 are adjacent another on the same side, numbering is in an anti-clockwise direction.

The scale zone is cut up along the latitude and longitude so as to divide it up into a certain number of grids, thus reducing the search for maps to be displayed during subsequent reading. By way of example, grids may be chosen such that they each contain no more than nine elementary maps.

2. Rotation of the maps

Rotation of the maps precedes digitization thereof and therefore consists in determining their digitization angle $v$.

Figure 2:
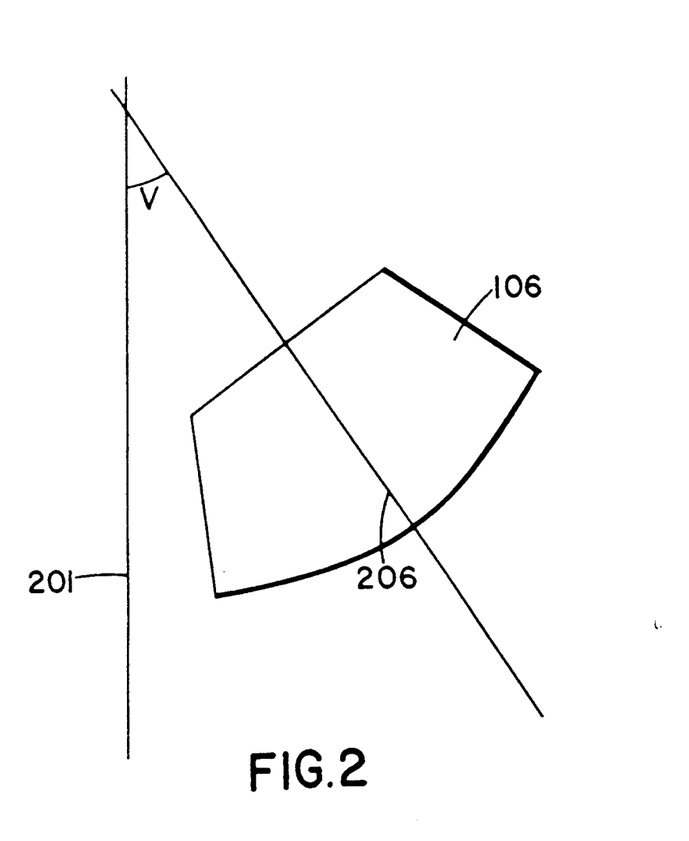
FIG. 2 illustrates the rotation of an elementary map before digitization.

In fact, in practice, and with reference to FIG. 2, the digitization angle $v$ and not the angle $\gamma$ introduced above solely by way of explanation, is the angle formed between the reference meridian 201 of the scale zone and the central meridian of the maps, e.g. meridian 206 of map 106. Under these conditions, it is of no importance whether, for the juxtapositioning of the maps discussed further on, maps are considered adjacent by their meridians or by their parallels.

The digitization angle $v$ of a map depends on:
the latitude L and the longitude G of the central point of the map, and through which its central meridian passes,
the characteristics of the ellipsoid to which the Earth is likened for making the map,
the type of projection adopted for forming the map, which may be a conical, cylindrical or azimuth, Mercator or Lambert projection for example.

The work "Géodésie classique bidimensionnelle" Tome 2, by Levallois, Eyrolles, 1970, supplies the elements for determining the digitization angles $v$ associated with the maps of the scale zone.

3. Digitization of the maps

It is carried out using a scanning system of the scanner type. Each map is disposed on the frame of the system, flat or rotary, but slanted by its digitization angle and is illuminated by a light source. The reading head scans the slanting map, pixel by pixel and pixel line by pixel line, and analyses the reflected light which is broken up into the three primary colors, red, green, blue by an optical device. The information collected is digitized and stored on any appropriate medium, e.g. magnetic tape.

Digitization of the maps may be accomplished for example using a scanner from the firm Hell, presented in number 1150 of December 1984 of the review "L industrie textile".

Before the scanning operation properly speaking, the operator scans the portions of the map of respectively different colors ($C_1$, $C_2$) in a given order, which he desires to take into account in order to determine the colorimetric parameters of these colors, here twelve in number and thus form the table of these colors. It is the above mentioned sampling operation. The digital information of the storage tape is, on the one hand, the number of the colors of all the pixels analysed and, on the other, for its subsequent processing during reading of the optical disk, the table of the colors, with their colorimetric parameters.

4. Cutting up the maps

We have already seen that, for this, the pixels to be eliminated are assigned the zero color ($C_o$). In practice, that will result in associating with each pixel concerned data according to which, during storage and juxtapositioning of the maps, the pixel will have to be deleted.

This step of the method takes place by displaying the digitized information of the scanner on a monitor and, using a slider, following on the monitor the contours of the portions to be cut out, so as to substitute the color $C_o$ for the colors $C_1-C_n$ associated with the pixels contained inside these contours.

5. Location of the maps

The purpose of locating an elementary map, besides defining the coordinates of the contours to be stored, is to overcome the deformations of the paper of the map due to temperature, pressure, humidity, . . . etc. and to establish a correspondence between the digitized coordinates and the geographical coordinates.

In fact, the locating operation consists in determining the deformation or buckling of the paper of the map, by a factor called deformation factor, so as to take it into account subsequently at the time of juxtapositioning of the maps and reading the filing disk, whereas the map is digitized and filed in its deformed condition.

In this step of the filing method, it is assumed that the maps have undergone a rectilinear deformation along a first axis and another rectilinear deformation along a second axis perpendicular to the first one, the two deformations not being however correlated with each other.

The procedure is the following.

The digitized information of the digitization medium is displayed on a monitor so as to display the map to be located on the screen of the monitor. Using a slider, two particular geodesic points of the map are designated with respective known latitudes and longitudes $L_1$, $G_1$ and $L_2$, $G_2$. These geographical coordinates correspond to two digitized pixels of the medium with respective matrix coordinates $x_1$, $y_1$ and $x_2$, $y_2$ in the pixel matrix XY associated with the map considered.

If we consider for example $(x_2-x_1)$, it is the number of columns in the pixel matrix associated with the map separating the two geodesic points designated. Because of the deformation of the paper, this number is false. But knowing the real geographical coordinates of the two points, the theoretical column shift $(X_2-X_1)$ can be deduced therefrom. Depending on these two numbers, one false and the other exact and theoretic, the geographical coordinates of the two points, the characteristics of the Earth ellipsoid and the type of projection of the map and digitization angle, the above mentioned work of Levallois gives the elements for further calculating the factor of deformation attached to the map and which is stored in combination with the digitized information thereof, on a digitization and locating medium, with also the geographical and matrix coordinates of the apices of the geometrical polygon containing the geographical information of the map.

6. Storage and juxtapositioning of the maps

The maps being digitized, with their respective digitization angles, cut out and located, they are juxtaposed or "stuck" on a buffer medium, which may be an optical disk.

Figure 3:
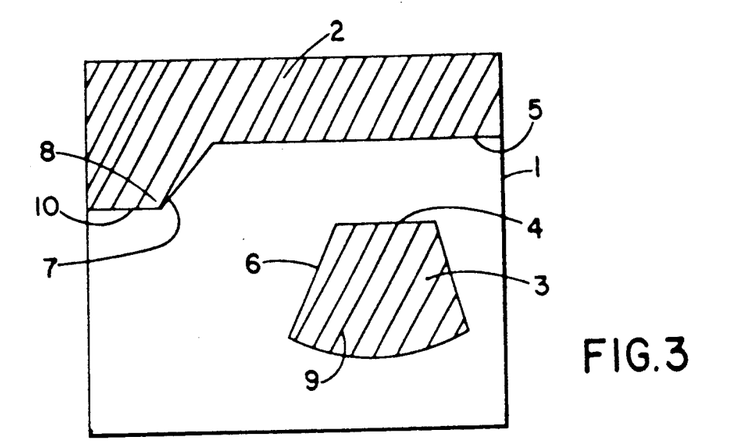
FIG. 3 illustrates the storage and juxtapositioning of a map with a scale zone portion.

For that, and by displaying the information of the digitization and locating medium on the screen 1 of a monitor, referenced in FIG. 3, the whole of the already juxtaposed information of zone 2 and that of the map 3 to be adjoined thereto is displayed, the upper edge 4 of map 3 extending along the lower edge portion 5 of zone 2 and the slanting left-hand edge 6 of map 3 slightly short of the slanted edge portion 7 of zone 2. The operator, by means of a slider, designates successively a point 8 in zone 2 and an origin point 9 of map 3, with the same geographical coordinates as point 8. Then, the differences of the matrix coordinates of the two points 8, 9 such as they appear on the screen are calculated, before the map 3 is then moved towards and partially under zone 2. The portions of zone 2 have priority over those of map 3, so that map 3 is perfectly juxtaposed with zone 2, the portions of map 3 already contained in zone 2 being purely and simply deleted.

In the case considered, it will be readily understood that if a useless portion of map 3 had remained above edge 4, this portion would have been deleted. On the other hand, a useless portion of map 3, on the left of edge 6, could have moved under the edge portion 10 of zone 2 and thus unfortunately have priority over information of other maps to be juxtaposed.

Once a map has been juxtaposed, it loses its identity.

The maps are juxtaposed in the order of the digitization worked out during the preceding step arranging them in order, the reference meridian of the scale zone always being displayed in a vertical position a display screen.

It will be noted that the scale zones are not juxtaposed with each other. For this reason, for each scale zone, peripheral overlapping strips are provided so as to make sure that a portion of a scale zone will always appear on a reading screen.

7. Squaring of the scale zones

The purpose of squaring or cross-ruling is to accelerate subsequent reading of the filed information by displaying it square by square or block by block.

With a scale zone thus stored on the buffer medium in the form of a matrix of pixels each represented by its color information, namely its color number, i.e. a number of bits depending on the number of colors chosen (4 bits for 12 colors), so as to take into account the capacities of the screens of display monitors, the matrix of the scale zone is cut up into elementary blocks here of 256 lines and 256 columns of pixels, which are here again grouped together 16 by 16 into overall blocks each formed of 4 lines and 4 columns of elementary blocks, an overall block covering the area of a display screen.

Then the elementary blocks cut up in the above way are digitized. This digitization of the elementary blocks of a screen block 12 of a scale zone 13, with reference to FIG. 4, takes place elementary block 14 by elementary block 14 in the increasing order of the columns of elementary blocks up to 4, then in the increasing order of the lines of elementary blocks up to 4, and screen block by screen block in the increasing order of the lines of screen blocks up to the last line of the pixel matrix, then in the increasing order of the columns of screen blocks up to the last column of the pixel matrix.

Figure 4:
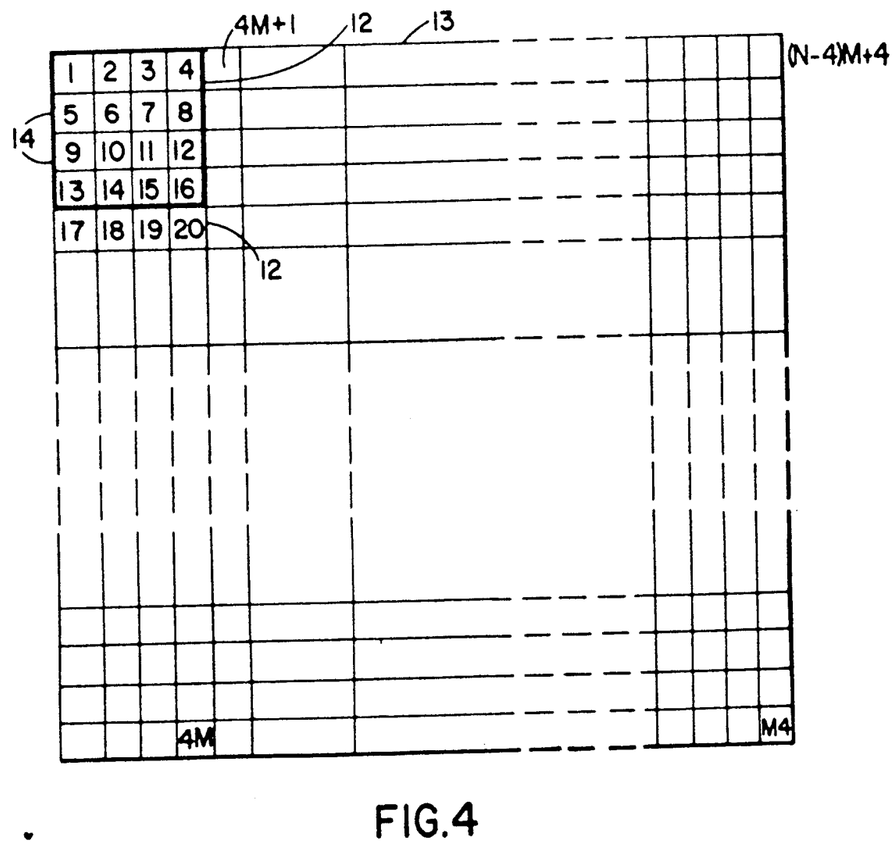
FIG. 4 represents the matrix of the elementary blocks of digitized pixels of the maps of a scale zone.

In the case of a scale zone matrix of 256M lines and 256N columns of pixels, namely a scale zone cut up into N columns of elementary blocks and M lines of elementary blocks, the digitization of the first line of elementary blocks 14 is:

$$1, 2, 3, 4, 4M+1, \ldots (N-4)M+3, (N-4)M+4,$$

of the second line $$5, 6, 7, 8, 4M+5, \ldots (N-4)M+7, (N-4)M+8,$$

of the last line $$4M-3, 4M-2, \ldots (N-4)M+4M-1,$$
$$(N-4)M+4M$$

namely $$4M-3, 4M-2, \ldots NM-1, NM$$

8. Compression of the information

In fact, before filing each scale zone on a digital optical disk, the information is compressed in accordance with a code which will now be analysed. It is carried out elementary block by elementary block and, for each elementary block, quarter of an elementary block by a quarter of an elementary block, namely in groups of 64 pixel lines.

In each of these groups, the number of pixels Ni associated with each Ci of the colors chosen, twelve in this case, is counted with:

$$N_1 > N_2 > \ldots > N_{11} > N_{12}$$

To the most frequent color $C_1$ is assigned a bit of value 0.

Using Huffman's code, which the invention improves as will be explained further on (See document "Digital Image Processing" by Rafael et al. Addison-Wesley, 1977), to the second most frequent color $C_2$ after $C_1$ a second bit is assigned of immediately higher significance, of value 1, and so on. Thus, to the colors $C_i$ of rank i is assigned the code formed of (i−1) bits of value 1 and a last least significant bit of value 0.

Huffman's code is however too degrading.

In accordance with the invention, to the second most frequent color $C_2$, after $C_1$, a second bit is assigned of immediately higher significance, of value 1, and a third bit of immediately lower significance and so the least significant of value x, x being equal to 1 if the next pixel is of the same color, as in an RLC (run length coding) code.

In order to compare Huffman's code and that of the invention, at the level of the second color let us note that, in Huffman's code, the filing of two adjacent pixels of the same color $C_2$ requires 4 bits—twice 10—whereas in the code of the invention three bits—101—are sufficient.

In Huffman's code, filing of two adjacent pixels, one of which is of color $C_2$, only requires 3 bits, but only if the other pixel is of color $C_1$. Since the probability that two adjacent pixels are of the same color is statistically higher than 0.5, it can be seen that the code of the invention at the level of these two colors performs better.

One pixel follows another in a scanning direction from left to right of each of the 64 lines of 256 pixels of each quarter of an elementary block.

To come back to the code of the invention, it will first of all be noted that it is based on the fact that the frequency of appearance of the three following colors $C_3$, $C_3$, $C_4$, $C_5$ is substantially the same and that coding of these three colors takes place then with the same number of bits. Two bits were then necessary, with the decimal FIG. 3 written 11 in binary, more than for the color $C_2$.

Since the filed pixels are analysed following each other, without a separator between them, it was also necessary to eliminate any ambiguity during subsequent reading taking place from the first pixel. And thus the following coding is proposed:

| | |
|---|---|
| $C_1$ | 0 |
| $C_2$ | 10 x |
| $C_3$ | 1100 x |
| $C_4$ | 1101 x |
| $C_5$ | 1110 x |
| $C_6$ | 100101 x |
| $C_7$ | 111100 x |
| $C_8$ | 111101 x |
| $C_9$ | 111110 x |
| $C_{10}$ | 11111100 |
| $C_{11}$ | 11111101 |
| $C_{12}$ | 11111110 |

A code FIN is also provided, written 11111111

The least significant bits x of colors $C_3$-$C_9$, as for $C_2$, are equal to 1 if the next pixel is of the same color, to 0 in the opposite case.

It will be noted that three pixels of the same color $C_2$ may be filed either 101100 or 100101. In the coding of the invention, the second possibility has been voluntarily dismissed, which has thus been reserved for the color $C_6$.

To sum up, the coding of the invention is a combination of the Huffman code and the RLC code but, in addition, adapted to the statistics of the colors of the image.

By way of example, it will be noted that in the example considered, the proportion of the color pixels $C_1$ is about 45%, of the color pixels $C_2$ about 20%, of the color pixels $C_3$, $C_4$, $C_5$ about 8% each, of the color pixels $C_6$-$C_9$, considered as a whole, about 10%, these latter pixels being coded, in the code of the invention, with the same number of bits.

Before coding, four bits were required per pixel; after coding, it can be seen that the amount of bits to be filed was 2.25 per pixel.

Recording of the digital optical disk takes place therefore quarter of an elementary block by quarter of an elementary block and elementary block by elementary block, in the digitization order of the squaring.

It will be noted that the compression codes are not associated with the pixels of the elementary block quarters on the filing medium, but these codes are stored in the reading equipment.

9. Recording of the digital optical disk

It only then remains to record in a conventional way on the digital optical disk the information obtained, namely to write in the information of the maps, of one or more scale zones, arranged in order, digitized, cut up, located but deformed, juxtaposed, cross ruled and compressed.

Since the digital optical disk is cut up into a continuous succession of areas, it also contains a table of concordance of the areas and of the squared blocks of the scale zones.

In combination with the information from each elementary map are recorded the geographical references thereof, namely:
 the geographical coordinates (latitude L and longitude G) and the matrix coordinates XY of the origin point of the map serving for locating,
 the geographical coordinate L, G and the matrix coordinates X, Y of the apices of the polygon containing the map,
 the digitization angle,
 the deformation factor,
 the characteristics of the Earth ellipsoid,
 the type of projection,
 the table of the colors.

In combination with the information of each scale zone are recorded:
 the scale,
 the number of the area or of the areas in which the digitized scale zone is to be found,
 the number of elementary maps in the scale zone,
 the positions of the geographical references of the maps,
 the geographical coordinates and the matrix coordinates of the apices of the polygon containing the scale zone,
 the size, in latitude and longitude, of the grids.

Finally, in the first two areas of the filing disk, the latitude and longitude cover of the filed zone, the number of scale zones recorded and the positions of the different scale zones are recorded.

B. READING

The method of recording a digital optical disk for filing geographical maps having been described above, we will now discuss the method of reading this disk, i.e. display of the maps.

The display consists in placing, in the center of the screen of a reading monitor, a point of given latitude L and longitude G of an elementary map of a filed scale zone, which it is desired to inspect.

Since the latitude and longitude of the point centered on the screen are known, i.e. by its geographical coordinates, the grid of the scale zone in which it is to be found is deduced and, consequently, the elementary maps located wholly or partially in the considered grid.

Since the contours of the elementary maps are also known, by their geographical references, the map is deduced which contains the point in question, the problem of possible overlapping having been resolved during selection of the scale zone.

To the geographical coordinates (L, G) of the point of the map correspond its matrix coordinates (X, Y). The number of the elementary blocks to be displayed in the center of the screen is then deduced therefrom. The number of the elementary blocks to be displayed in the left upper corner is deduced therefrom. After short processing, it will only remain to display the 16 elementary blocks of the screen block to be displayed, in the order of their digitization established during squaring of the scale zones during the recording process.

As soon as a screen block to be displayed has been isolated, it is read, decompressed then displayed: this procedure takes place in three steps, and while a screen block is decompressed, the next screen block is read and the preceding screen block is displayed, the display may be made on any device ; it may then be a monitor screen, but also a liquid crystal mosaic and even a paper medium.

Once a screen block has been displayed, one can move over the scale zone of the displayed map and change scale zones by shifting a line or a column of elementary blocks, i.e. by a quarter of a screen block; it is also possible to insert a screen block portion on the display screen, e.g. a group of four elementary blocks, so as to represent a portion of the zone previously displayed on another scale, if the corresponding maps have been filed.

Figure 5:
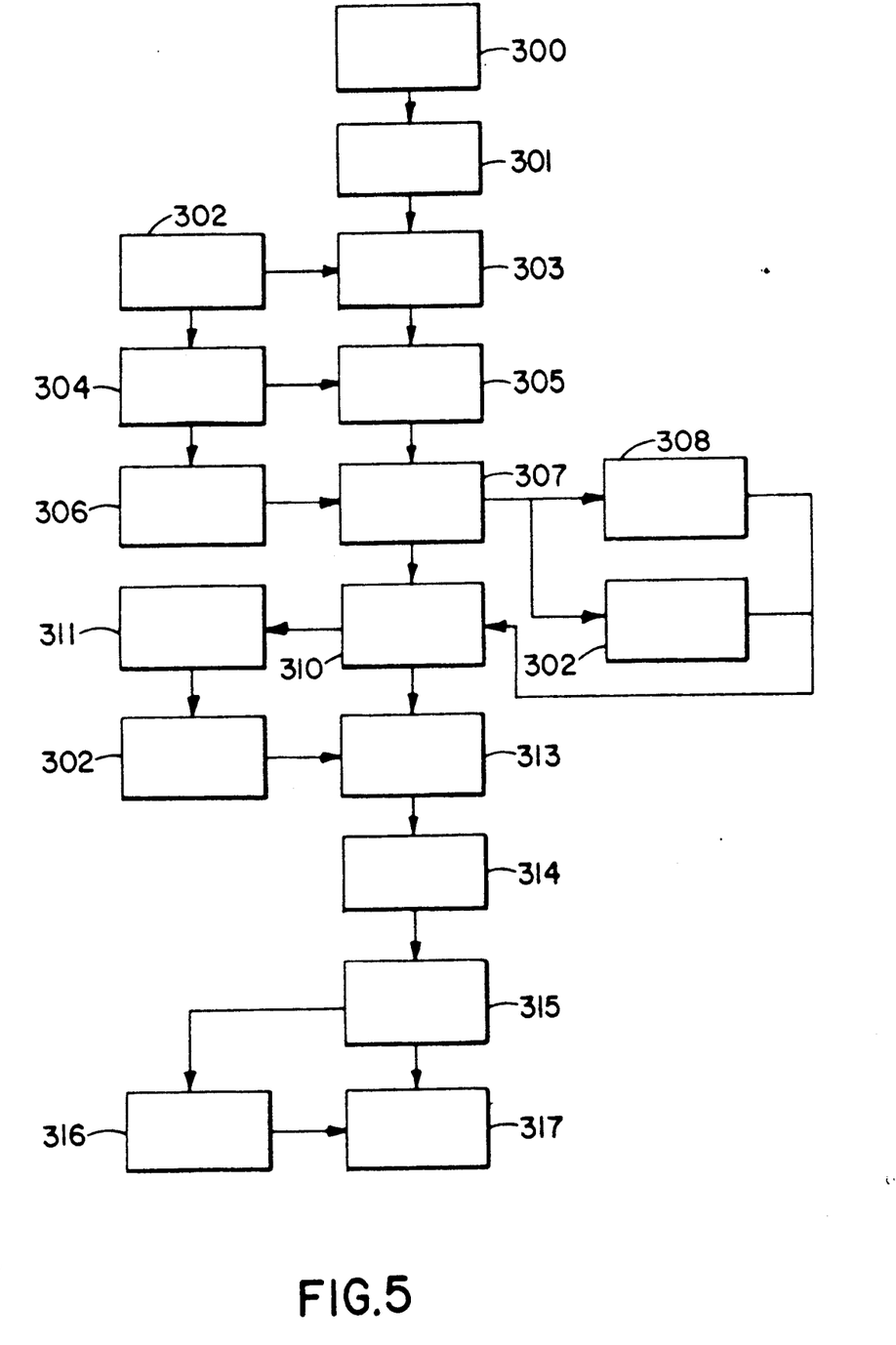
FIG. 5 shows the flow chart of the different steps of the filing method of the invention.
Figure 6:
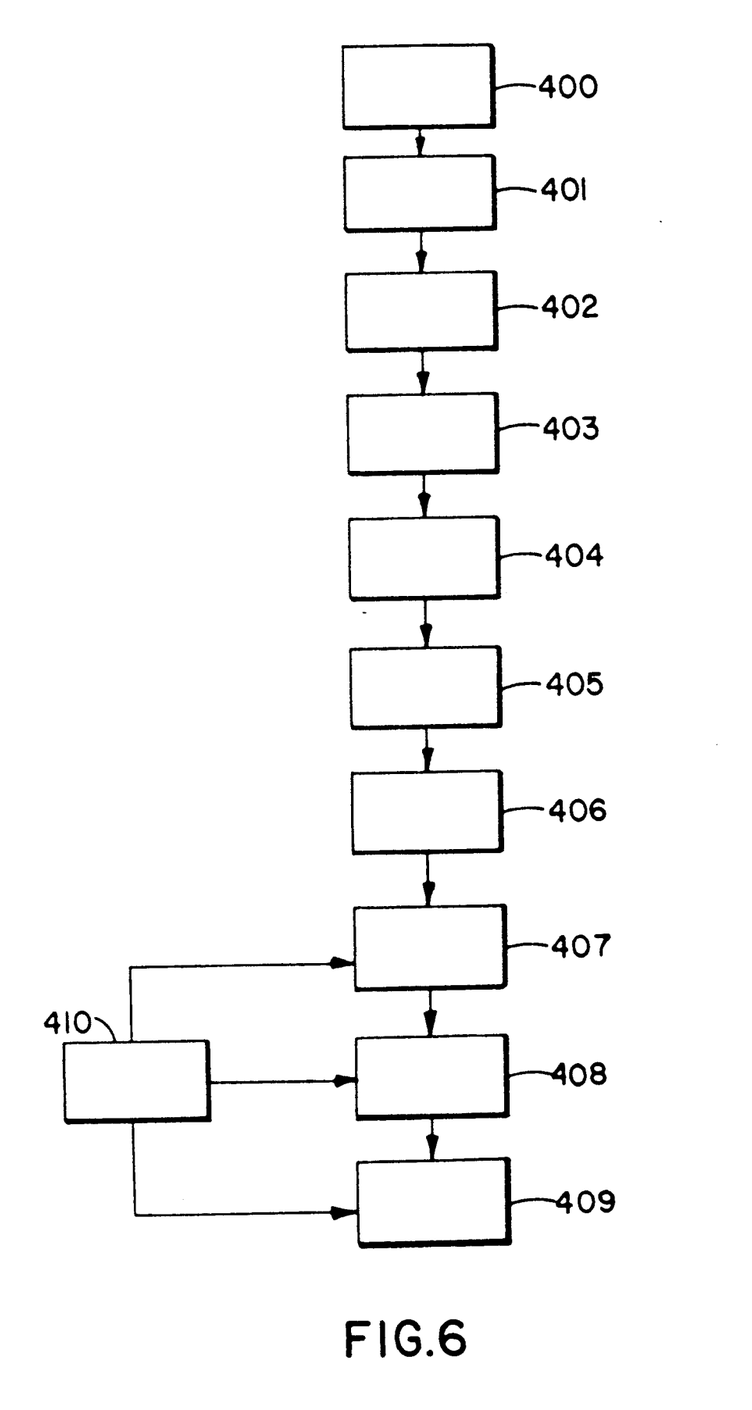
FIG. 6 shows the flow chart of the different steps of the reading method of the invention.

To sum up, the flow chart of FIG. 5 represents the different steps of the filing process and so of recording of the digital optical disk, that of FIG. 6 that of the method of reading the optical disk.

As far as recording is concerned, with a file of maps 300, at 301 they are arranged in order. Using a first algorithm, computer 302, e.g. of the type HP 1000-A900 from the firm Hewlett Packard, determines at 303 the digitization angles of the maps and the grid formation. With a scanner 304, the maps are digitized at 305. Using a computer 302, the information from scanner 304 is displayed on the screen of a monitor 306, the operator initiates at 307 the cutting out of the useless portions of the maps. With a monitor 308 and a second algorithm, the computer 302 determines at 310 the deformation factors of the maps. With a monitor 311 and the computer 302, the operator initiates at 313 the storage and juxtapositioning of the maps on a buffer disk. Then the scale zones are cross ruled at 314, then at 315, in a compression module, the information is compressed which is associated with the pixels digitized in accordance with a compression algorithm, e.g. the one analysed above. Then using laser recording equipment 316, here of the type LD 1200 of the firm OSI/CDC, the digital optical filing disk is recorded at 317. The whole of these steps of the recording method may be accomplished using the computer HP1000-A900.

As far as reading the disk 400 obtained at 317 in the recording process is concerned, and after reading thereof in the same laser apparatus mentioned above, the scale zone is first of all determined at 401. Then the grid containing the point to be placed in the center of the display screen 409 is determined at 402 before the maps wholly or partially contained in the grid are determined at 403. Then the map containing this point is determined at 404, by its contour, at 405 using a display preparation module, the elementary block containing this point is determined and at 406 the corresponding screen block. It is read by means of a block reading module 407. Then it is decompressed in a block decompression module 408, in accordance with a decompression algorithm corresponding to the compression algorithm before, in a display module 409, displaying on the screen. The activation of the reading, decompression and display modules is controlled by a sequencer module 410. Reading may be provided using a computer for example of the type HP1000-A900 from the firm Hewlett Packard.

As complement to the above description, the program is given hereafter for implementing the steps for rotation of the maps, cutting up of the maps and storage and juxtapositioning of the maps in the filing method.

```
2   $FILES 2,2
3         PROGRAM   ANGLENUM
4
5         IMPLICIT NONE
6   C
7         INTEGER I,J
8         INTEGER IOS
9         INTEGER NCARTE
10        INTEGER NSEULE
11        INTEGER ORDRE_NUM(100)
12        INTEGER REF(50)
13        INTEGER REF_UTIL(100)
14  C
15        INTEGER ANGLE1_DEG(100)
16        INTEGER ANGLE1_MIN(100)
17        REAL ANGLE1(100)
18  C
19        INTEGER ANGLE2_DEG(100)
20        INTEGER ANGLE2_MIN(100)
21        REAL ANGLE2(100)
22  C
23        INTEGER MERDEP_DEG(100)
24        INTEGER MERDEP_MIN(100)
```

```
25        REAL MERDEP(100)
26 C
27        INTEGER MERCOR_DEG(100)
28        INTEGER MERCOR_MIN(100)
29        REAL MERCOR(100)
30 C
31        REAL ALPHANUM(100)
32        REAL AXE(50,2)
33 C
34        INTEGER REF_ZONE_DEG
35        INTEGER REF_ZONE_MIN
36        REAL REF_ZONE
37 C
38        REAL PI,ALPHA1,ALPHA2
39 C
40        CHARACTER*1   POINT_ZONE
41        CHARACTER*5   NOMCARTE(100)
42        CHARACTER*9   NOMREEL(100)
43        CHARACTER*10  NOMELLIP
44        CHARACTER*1   TYPE_PROJ(100)
45        CHARACTER*1   POINT_CARD1(100)
46        CHARACTER*1   POINT_CARD2(100)
47        CHARACTER*5   CARTEVOI(100)
48        CHARACTER*1   POINT_COR(100)
49        CHARACTER*1   POINT_DEP(100)
50        CHARACTER*40  NOMFICH
51 C
52        PI = 4.*ATAN(1.)
53 C
54        WRITE(1,*) 'Filename to process : _'
55        READ(1,*) NOMFICH
56        OPEN(30,FILE=NOMFICH,IOSTAT=IOS,ERR=130)
57        READ(30,990,IOSTAT=IOS,ERR=130) POINT_ZONE,REF_ZONE_DEG
58       *                                ,REF_ZONE_MIN
59        I = 1
60        DO WHILE (.TRUE.)
61           READ(30,991,END=100) NOMCARTE(I),NOMREEL(I),TYPE_PROJ(I),
62       *                        POINT_CARD1(I),ANGLE1_DEG(I),ANGLE1_MIN(I),
63       *                        POINT_CARD2(I),ANGLE2_DEG(I),ANGLE2_MIN(I),
64       *                        CARTEVOI(I),
65       *                        POINT_COR(I),MERCOR_DEG(I),MERCOR_MIN(I),
66       *                        POINT_DEP(I),MERDEP_DEG(I),MERDEP_MIN(I),
67       *                        REF_UTIL(I)
68           I = I+1
69        ENDDO
70 100    NCARTE = I - 1
71 C
72        REF_ZONE = (REF_ZONE_MIN / 60. + REF_ZONE_DEG)*PI/180.
73        IF (POINT_ZONE.EQ.'W') THEN
74           REF_ZONE = - REF_ZONE
75        ENDIF
76        DO I =1,NCARTE
77          ANGLE1(I) = (ANGLE1_DEG(I) + ANGLE1_MIN(I)/60.)*PI/180.
78          IF (POINT_CARD1(I).EQ.'S'.OR.POINT_CARD1(I).EQ.'W')THEN
79             ANGLE1(I) = - ANGLE1(I)
80          ENDIF
81          ANGLE2(I) = (ANGLE2_DEG(I) + ANGLE2_MIN(I)/60.)*PI/180.
82          IF (POINT_CARD2(I).EQ.'S'.OR.POINT_CARD2(I).EQ.'W')THEN
83             ANGLE2(I) = - ANGLE2(I)
84          ENDIF
85          MERDEP(I) = (MERDEP_DEG(I) + MERDEP_MIN(I)/60.)*PI/180.
86          IF (POINT_DEP(I).EQ.'S'.OR.POINT_DEP(I).EQ.'W')THEN
87             MERDEP(I) = - MERDEP(I)
88          ENDIF
89          IF (CARTEVOI(I).NE.'     ') THEN
90            MERCOR(I) = (MERCOR_DEG(I) + MERCOR_MIN(I)/60.)*PI/180.
91            IF (POINT_COR(I).EQ.'S'.OR.POINT_COR(I).EQ.'W')THEN
92               MERCOR(I) = - MERCOR(I)
```

```
93              ENDIF
94           ENDIF
95         ENDDO
96  C
97         OPEN(81,FILE = '/CARTO/SUPER_MAC/PROG/ELLIPSOIDE.DAT')
98         I = 1
99         DO WHILE (.TRUE.)
100           READ(81,*,END = 110) REF(I),AXE(I,1),AXE(I,2),NOMELLIP
101           I = I+1
102        ENDDO
103 110    CONTINUE
104 C
105        DO I = 1,NCARTE
106           IF (CARTEVOI(I).EQ.'      ') THEN
107              IF (TYPE_PROJ(I).EQ.'L') THEN
108                 CALL LAMBERT(MERDEP(I),REF_ZONE,ALPHANUM(I),ANGLE1(I)
109       *                    ,ANGLE2(I),AXE(REF_UTIL(I),1),AXE(REF_UTIL(I),2))
110              ELSEIF (TYPE_PROJ(I).EQ.'M') THEN
111                 CALL MERCAT(MERDEP(I),REF_ZONE,ALPHANUM(I),ANGLE1(I)
112       *                    ,ANGLE2(I),AXE(REF_UTIL(I),1),AXE(REF_UTIL(I),2)
113              ELSE
114                 GOTO 120
115              ENDIF
116           ENDIF
117        ENDDO
118 C
119        DO I = 1,NCARTE
120           IF (CARTEVOI(I).NE.'      ') THEN
121              IF (TYPE_PROJ(I).EQ.'L') THEN
122                 CALL LAMBERT(MERDEP(I),MERCOR(I),ALPHA1,ANGLE1(I)
123       *                    ,ANGLE2(I),AXE(REF_UTIL(I),1),AXE(REF_UTIL(I),2)
124              ELSEIF (TYPE_PROJ(I).EQ.'M') THEN
125                 CALL MERCAT(MERDEP(I),MERCOR(I),ALPHA1,ANGLE1(I)
126       *                    ,ANGLE2(I),AXE(REF_UTIL(I),1),AXE(REF_UTIL(I),2)
127              ELSE
128                 GOTO 120
129              ENDIF
130 C
131              J = 1
132              DO WHILE (NOMCARTE(J).NE.CARTEVOI(I))
133                 J = J + 1
134              ENDDO
135 C
136              IF (TYPE_PROJ(J).EQ.'L') THEN
137                 CALL LAMBERT(MERDEP(J),MERCOR(I),ALPHA2,ANGLE1(J)
138       *                    ,ANGLE2(J),AXE(REF_UTIL(J),1),AXE(REF_UTIL(J),2)
139              ELSEIF (TYPE_PROJ(J).EQ.'M') THEN
140                 CALL MERCAT(MERDEP(J),MERCOR(I),ALPHA2,ANGLE1(J)
141       *                    ,ANGLE2(J),AXE(REF_UTIL(J),1),AXE(REF_UTIL(J),2)
142              ELSE
143                 GOTO 120
144              ENDIF
145 C
146              ALPHANUM(I) = ALPHA1 - ALPHA2 + ALPHANUM(J)
147           ENDIF
148        ENDDO
149 C
150        REWIND (80)
151        READ (80,990) POINT_ZONE,REF_ZONE_DEG,REF_ZONE_MIN
152        DO I = 1,NCARTE
153
154           WRITE(80,992) NOMCARTE(I),NOMREEL(I),TYPE_PROJ(I),
155       *                 POINT_CARD1(I),ANGLE1_DEG(I),ANGLE1_MIN(I)
156       *                 POINT_CARD2(I),ANGLE2_DEG(I),ANGLE2_MIN(I)
157       *                 CARTEVOI(I),
158       *                 POINT_COR(I),MERCOR_DEG(I),MERCOR_MIN(I),
159       *                 POINT_DEP(I),MERDEP_DEG(I),MERDEP_MIN(I),
160       *                 ALPHANUM(I),I,REF_UTIL(I)
```

```
161
162         ENDDO
163         CLOSE (80)
164         CLOSE (81)
165         STOP
166   120   WRITE(1,*)'Verify input file'
167         STOP
168   130   WRITE(1,*) ios
169         STOP
170   990   FORMAT(1X,A1,I2,1X,I2)
171   991   FORMAT(1X,A5,1X,A9,3X,A1,2X,A1,I2,1X,I2,2X,A1,I2,1X,I2,2X,A5,1X
172        *,A1,I2,1X,I2,2X,A1,I2,1X,I2,14X,I2)
173   992   FORMAT(1X,A5,1X,A9,3X,A1,2X,A1,I2.2,'.',I2.2,2X
174        *,A1,I2.2,'.',I2.2,2X,A5,1X
175        *,A1,I2.2,'.',I2.2,2X,A1,I2.2,'.',I2.2,2X,F6.3,2X,I2.2,2X,I2.2)
176         END
```

Module ANGLENUM        No errors       Prog: 5145      Blank common: none
FTN7X 2540/860213      No warnings     Save: none      Local EMA:    none

```
88          SUBROUTINE COUP_3P
89
90          IMPLICIT NONE
91
92          INTEGER DCB1(2064)
93          INTEGER DCB2(2064)
94          INTEGER BE(2048)
95          INTEGER RECLEN
96          INTEGER I,J
97          INTEGER LG
98          INTEGER LGMAX
99          CHARACTER*40 NMAPCOUP
100         CHARACTER*40 NDESCOUP
101         CHARACTER*40 INAMS
102         INTEGER ILEN
103         INTEGER TRIMLEN
104         REAL A,B
105         REAL SK3,SP
106         INTEGER*4 RECORD,POSITION
107         INTEGER ERROR1,ERROR2
108         INTEGER FMPCOPY
109         INTEGER*4 PLIGNE
110         INTEGER*4 DLIGNE
111         INTEGER*2 MOT_INTER
112         INTEGER*4 XINTER
113         INTEGER*4 LIGNE1
114         INTEGER*4 LIGNE2
115
116         COMMON /BIDON/BE,DCB1
117
118         INCLUDE SUPER_MAC.INC,NOLIST
119   C
120         IF(AX.EQ.BX) THEN
121            BX=BX+1
122         ENDIF
123         A=FLOAT(AY-BY)/FLOAT(AX-BX)
124         B=FLOAT(AY)-A*FLOAT(AX)
125
126         SK3=FLOAT(K3Y)-(A*FLOAT(K3X) + B)
127
128         WRITE(1,*)'Filename to process : _'
129         READ(1,*)INAMS
130   C
131         ILEN=TRIMLEN(INAMS)
132         NMAPCOUP='/CARTES/'//INAMS(1:ILEN)//'.MAP'
133         NDESCOUP='/CARTO/SUPER_MAC/DES/'//INAMS(1:ILEN)//'.DES'
134         DUMMY=FMPCOPY(NDES,ERROR1,NDESCOUP,ERROR2,DCB1,288,' ')
135         IF (ERROR1.LT.0) CALL FMPREPORTERROR(ERROR1,NDES)
```

```
136           IF (ERROR2.LT.0) CALL FMPREPORTERROR(ERROR2,NDESCOUP)
137           IF (ERROR1.LT.0.OR.ERROR2.LT.0) CALL LECT_ERROR
138  C
139           CALL FICH_OPEN(DCB1,NMAP,NBPIX,NBLIG,RECLEN,LGMAX,0)
140           CALL FICH_OPEN(DCB2,NMAPCOUP,NBPIX,NBLIG,RECLEN,LGMAX,1)
141
142           POSITION=-1
143           RECORD=1
144  C
145           LIGNE1=A*1+B
146           LIGNE2=A*LGMAX*4+B
147           PLIGNE=MIN(LIGNE1,LIGNE2)
148           DLIGNE=MAX(LIGNE1,LIGNE2)
149           IF(PLIGNE.LT.1.OR.PLIGNE.GT.NBLIG) PLIGNE=1
150           IF(DLIGNE.GT.NBLIG.OR.DLIGNE.LT.1) DLIGNE=NBLIG
151  C
152           SP=1.-(A+B)
153           IF(SK3*SP.LT.0) THEN
154  C
155             DO I=1,PLIGNE-1
156               DUMMY=FMPREAD(DCB1,ERROR,BE,RECLEN)
157               IF (ERROR.LT.0) CALL FMPREPORTERROR(ERROR,NMAP)
158               CALL FMPWRITE(DCB2,ERROR,BE,RECLEN)
159               IF (ERROR.LT.0) CALL FMPREPORTERROR(ERROR,NMAPCOUP)
160             ENDDO
161           ELSE
162  C
163             DO I=1,LGMAX
164               BE(I)=0
165             ENDDO
166             DO I=1,PLIGNE-1
167               CALL FMPWRITE(DCB2,ERROR,BE,RECLEN)
168               IF (ERROR.LT.0) CALL FMPREPORTERROR(ERROR,NMAPCOUP)
169             ENDDO
170  C
171             RECORD=PLIGNE
172             CALL FMPSETPOSITION(DCB1,ERROR,RECORD,POSITION)
173             IF (ERROR.LT.0) CALL FMPREPORTERROR(ERROR,NMAP)
174           ENDIF
175  C
176           DO I=PLIGNE,DLIGNE
177
178             DUMMY=FMPREAD(DCB1,ERROR,BE,RECLEN)
179             IF (ERROR.LT.0) CALL FMPREPORTERROR(ERROR,NMAP)
180
181             XINTER=(FLOAT(I)-B)/A
182             IF(XINTER.GT.NBPIX) XINTER=NBPIX
183             IF(XINTER.LT.1) XINTER=1
184
185             MOT_INTER=(XINTER-1)/4 + 1
186             SP=FLOAT(I)-(A+B)
187             IF(SK3*SP.GE.0) THEN
188               DO J=1,MOT_INTER-1
189                 BE(J)=0
190               ENDDO
191             ENDIF
192  C
193             J=4*(MOT_INTER-1)+1
194             LG=MOT_INTER
195
196             SP=FLOAT(I)-(A*FLOAT(J)+B)
197             IF(SK3*SP.GE.0.)THEN
198               BE(LG)=IAND(BE(LG),7777B)
199             ENDIF
200             J=J+1
201             SP=FLOAT(I)-(A*FLOAT(J)+B)
202             IF(SK3*SP.GE.0.)THEN
203               BE(LG)=IAND(BE(LG),170377B)
```

```
204         ENDIF
205         J=J+1
206         SP=FLOAT(I)-(A*FLOAT(J)+B)
207         IF(SK3*SP.GE.0.)THEN
208            BE(LG)=IAND(BE(LG),177417B)
209         ENDIF
210         J=J+1
211         SP=FLOAT(I)-(A*FLOAT(J)+B)
212         IF(SK3*SP.GE.0.)THEN
213            BE(LG)=IAND(BE(LG),177760B)
214         ENDIF
215 C
216         J = J+1
217         SP=FLOAT(I)-(A*FLOAT(J)+B)
218
219         IF(SK3*SP.GE.0) THEN
220            DO J=MOT_INTER+1,LGMAX
221               BE(J)=0
222            ENDDO
223         ENDIF
224
225         CALL FMPWRITE(DCB2,ERROR,BE,RECLEN)
226
227         ENDDO
228 C
229         SP=FLOAT(DLIGNE+1)-(A+B)
230         IF(SK3*SP.LT.0) THEN
231 C
232            DO I=DLIGNE+1,NBLIG
233               DUMMY=FMPREAD(DCB1,ERROR,BE,RECLEN)
234               IF (ERROR.LT.0) CALL FMPREPORTERROR(ERROR,NMAP)
235               CALL FMPWRITE(DCB2,ERROR,BE,RECLEN)
236               IF (ERROR.LT.0) CALL FMPREPORTERROR(ERROR,NMAPCOUP)
237            ENDDO
238         ELSE
239 C
240            DO I=1,LGMAX
241               BE(I)=0
242            ENDDO
243            DO I=DLIGNE+1,NBLIG
244               CALL FMPWRITE(DCB2,ERROR,BE,RECLEN)
245               IF (ERROR.LT.0) CALL FMPREPORTERROR(ERROR,NMAPCOUP)
246            ENDDO
247         ENDIF
248         DUMMY=FMPCLOSE(DCB1)
249         DUMMY=FMPCLOSE(DCB2)
250         RETURN
251         END
```

Module COUP_3P      No errors    Data:  57    Blank common: none
FTN7X 2540/860213   No warnings  Code:  916   Stack size:   2181

```
121     SUBROUTINE SCOTCH_FICH(REPARATION)
122
123     IMPLICIT NONE
124
125     INTEGER BUF(2048)
126     INTEGER DCB(2064)
127     INTEGER ELIGNE(2560)
128     INTEGER*4 MOTPIXEL
129     INTEGER*4 NUMSECT
130     INTEGER*4 PPIXEL
131     INTEGER*4 DPIXEL
132     INTEGER*4 PLIGNE
133     INTEGER*4 DLIGNE
134     INTEGER*4 PREM_SECT
135     INTEGER*4 DER_SECT
136     INTEGER   NSECT
137     INTEGER*4 PFICH
```

```
138         INTEGER*4 PIXFICH
139         INTEGER*4 MOTDON
140         INTEGER*4 MOTFICH
141         INTEGER PIXMOT
142         INTEGER*4 I,J
143         INTEGER RECLEN,LGMAX
144         INTEGER PIXEL
145         INTEGER*4 POSITION
146         INTEGER*4 DEBUT
147         INTEGER NBDES
148         INTEGER IOS
149         CHARACTER*40 LIST(60)
150         CHARACTER*40 CHOIX
151         LOGICAL REPARATION
152
153         COMMON /BIDON/BUF,DCB
154
155         INCLUDE SUPER_MAC.INC,NOLIST
156
157         IF(REPARATION) GOTO 100
158 C
159         CALL READ_DES
160         IF((ECHELLE.EQ.1000000J).OR.(ECHELLE.EQ.2000000J)) THEN
161             IF((COEFX.LT.4950.).OR.(COEFX.GT.5050.).OR.(COEFY.LT.4950.).O
162         *       (COEFY.GT.5050.)) GOTO 222
163         ELSE
164             IF((COEFX.LT.6610.).OR.(COEFX.GT.6720.).OR.(COEFY.LT.6610.).O
165         *       (COEFY.GT.6720.)) GOTO 222
166         ENDIF
167         IF(NBCOINS.LT.3) GOTO 333
168
169 100     CONTINUE
170
171         WRITE(1,*)
172         WRITE(1,*) NMAP
173         WRITE(1,*)'Are you sure ? _'
174         READ(1,*)CHOIX
175         IF(CHOIX.NE.'OUI') GOTO 9999
176         CALL FICH_OPEN(DCB,NMAP,NBPIX,NBLIG,RECLEN,DUMMY,0)
177         PLIGNE=ADY-BFY+1
178         IF(PLIGNE.LT.1) GOTO 700
179         DLIGNE=PLIGNE+NBLIG-1
180         IF(DLIGNE.GT.NLIG_ZONE) GOTO 700
181         PPIXEL=ADX-BFX+1
182         IF(PPIXEL.LT.1) GOTO 700
183         DPIXEL=PPIXEL+NBPIX-1
184         IF(DPIXEL.GT.NSEC_LIG*2048) GOTO 700
185         MOTPPIXEL=(PPIXEL-1)/4 + 1
186         POSITION=-1
187         DEBUT=1
188         DUMMY=FMPSETPOSITION(DCB,ERROR,DEBUT,POSITION)
189         IF(ERROR.LT.0) CALL FMPREPORTERROR(ERROR,NMAP)
190 C
191         PREM_SECT=(MOTPPIXEL-1)/512+1
192         DER_SECT=((DPIXEL-1)/4)/512 + 1
193         NSECT=DER_SECT-PREM_SECT+1
194         DO I=PLIGNE,DLIGNE
195             DUMMY=FMPREAD(DCB,ERROR,BUF,RECLEN)
196             IF(ERROR.LT.0) CALL FMPREPORTERROR(ERROR,NMAP)
197             NUMSECT=(I-1)*NSEC_LIG + SO + PREM_SECT - 1
198             CALL READ_DON(BLIGNE,NUMSECT,NSECT)
199             PFICH=0
200             DO J=PPIXEL,DPIXEL
201                 PFICH=PFICH+1
202                 MOTDON=(J - (PREM_SECT-1)*2048 - 1)/4 + 1
203                 PIXMOT=J - (PREM_SECT-1)*2048 - (MOTDON-1)*4
204                 IF(IAND(ISHFT(BLIGNE(MOTDON),-(4-PIXMOT)*4),17B).EQ.0) THEN
205                     MOTFICH=(PFICH-1)/4+1
```

```
206              PIXFICH=PFICH-(MOTFICH-1)*4
207              PIXEL=IAND(ISHFT(BUF(MOTFICH),-(4-PIXFICH)*4),17B)
208              PIXEL=ISHFT(PIXEL,(4-PIXMOT)*4)
209              BLIGNE(MOTDON)=IOR(BLIGNE(MOTDON),PIXEL)
210           ENDIF
211         ENDDO
212         CALL WRITE_DON(BLIGNE,NUMSECT,NSECT)
213       ENDDO
214 C
215       CALL FLUSH_BUF_DON
216       IF(REPARATION) GOTO 9999
217       CALL ECRIT_TBL
218       OPEN(70,FILE=LST_DES,ERR=500,IOSTAT=IOS,STATUS='OLD')
219       READ(70,'(I3)',ERR=500,IOSTAT=IOS) NBDES
220       DO I=1,NBDES
221          READ(70,'(A40)',ERR=500,IOSTAT=IOS) LIST(I)
222       ENDDO
223       REWIND(70)
224       NBDES = NBDES + 1
225       WRITE(70,'(I3)',ERR=500,IOSTAT=IOS) NBDES
226       DO I=1,NBDES-1
227          WRITE(70,'(A40)',ERR=500,IOSTAT=IOS) LIST(I)
228       ENDDO
229       WRITE(70,'(A40)',ERR=500,IOSTAT=IOS) NDES
230 501   CLOSE(70)
231       OPEN(71,FILE=NDES,ERR=600,IOSTAT=IOS,STATUS='OLD')
232       WRITE(71,'(I5)',ERR=600,IOSTAT=IOS) NBLIG
233       WRITE(71,'(I5)',ERR=600,IOSTAT=IOS) NBPIX
234       DO J=1,16
235          WRITE(71,'(3I4)',ERR=600,IOSTAT=IOS)
236       *     LUTF(J,1),LUTF(J,2),LUTF(J,3)
237       ENDDO
238       WRITE(71,'(A1)',ERR=600,IOSTAT=IOS) TYPEPROJ
239       WRITE(71,'(2F14.8)',ERR=600,IOSTAT=IOS) REF1,REF2
240       WRITE(71,'(F14.8)',ERR=600,IOSTAT=IOS) REFTR
241       WRITE(71,'(F8.3)',ERR=600,IOSTAT=IOS) ALPHANUM
242       WRITE(71,'(I2)',ERR=600,IOSTAT=IOS) REFERENTIEL
243       WRITE(71,'(2F14.8)',ERR=600,IOSTAT=IOS) LORIG,GORIG
244       XORIG = ADX + XORIG - BFX
245       YORIG = ADY + YORIG - BFY
246       WRITE(71,'(2I6)',ERR=600,IOSTAT=IOS) XORIG,YORIG
247       WRITE(71,'(2F14.3)',ERR=600,IOSTAT=IOS) COEFX,COEFY
248       WRITE(71,'(I2)',ERR=600,IOSTAT=IOS) NBCOINS
249       DO J= 1,NBCOINS
250          WRITE(71,'(2F14.8)',ERR=600,IOSTAT=IOS) LCOINS(J),GCOINS(J)
251       ENDDO
252       DO J= 1,NBCOINS
253          XCOINS(J) = ADX + XCOINS(J) - BFX
254          YCOINS(J) = ADY + YCOINS(J) - BFY
255          WRITE(71,'(2I6)',ERR=600,IOSTAT=IOS) XCOINS(J),YCOINS(J)
256       ENDDO
257       CLOSE(71)
258 9999  CONTINUE
259       RETURN
260 222   WRITE(1,*) 'Error detected in scale cosf'
261       CALL LECT_ERROR
262       RETURN
263 333   WRITE(1,*) 'Error detected'
264       CALL LECT_ERROR
265       RETURN
266 500   WRITE(1,*) 'I/O Error',IOS,' on ',LST_DES
267       CALL LECT_ERROR
268       GOTO 501
269 600   WRITE(1,*) 'I/O Error ',IOS,' on ',NDES
270       CALL LECT_ERROR
271       RETURN
272 700   WRITE(1,*)'Position error'
273       CALL LECT_ERROR
274       RETURN
275       END
```

We claim:

1. Method of filing geographical maps contained in at least a given scale zone having a reference meridian and reference geographical coordinates, each map having a respective central meridian and map information recorded on paper subject to deformation, comprising the steps of: arranging the maps in a predetermined order; determining, for each map, an angle formed between the reference meridian of the scale zone and the central meridian of each map; turning each map through the respective angle; digitizing each turned map to obtain digitized map information and digitized map geographical coordinates; establishing a correspondence between the digitized map geographical coordinates of each map and the reference geographical coordinates of the scale zone; determining a deformation factor of the paper associated with each map; juxtaposing and storing the maps and each deformation factor on a buffer medium; and recording the stored maps from the buffer medium on a filing medium.

2. Filing method according to claim 1, wherein the digitizing step is effected by scanning.

3. Filing method according to claim 1, wherein the digitizing step is performed by forming a table of colors, subdividing the digitized map information into pixels and associating with each pixel of the maps one of the colors of the table.

4. Filing method according to claim 3, wherein each map has additional information which is digitized and subdivided into pixels but is not desired to be recorded, and further comprising the step of removing the additional information by substituting for each of the colors associated with the pixels of the additional information a zero color.

5. Filing method according to claim 3, wherein the storing and juxtaposing step is performed by superimposing the digitized map geographical coordinates of a reference point of a first map with the digitized map geographical coordinates of another reference point of a second map, said second map being pre-stored in the buffer medium and having pixels of a higher priority than the pixels of the first map.

6. Filing method according to claim 1, wherein the recording step is performed by also recording the deformation factor of each step.

7. Filing method according to claim 1, and further comprising the step of cross-ruling the scale zone into blocks intended to cover a display screen area.

8. Filing method according to claim 1, and further comprising the step of compressing the digitized map information of the stored maps before recording.

9. Filing method according to claim 1, wherein the maps are recorded on a digital optical disk.

10. Filing method according to claim 1, wherein, after arranging the maps in order, the scale zone is formed in a grid.

11. Method of reading a filing medium recorded according to the method of claim 1, and further comprising the step of positioning a map point having digitized map geographical coordinates of a first map in the center of a display screen.

12. Reading method according to claim 11, and further comprising the step of forming the scale zone into a grid containing a reference point with the reference geographical coordinates, and placing said reference point in the center of the display screen.

13. Reading method according to claim 12, and further comprising the step of cross-ruling the scale zone into blocks, determining the map containing said map point, determining the block to be displayed in the center of the screen, and displaying the screen block in the center of which said block is to be found.

* * * * *